(12) United States Patent
Ramotowski

(10) Patent No.: US 7,528,195 B2
(45) Date of Patent: May 5, 2009

(54) MIXING AND CURING CARBOXY-TERMINATED BUTADIENE-NITRILE RUBBER, EPOXY RESIN AND CURING AGENT

(75) Inventor: Thomas S. Ramotowski, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 392 days.

(21) Appl. No.: 11/636,690

(22) Filed: Dec. 11, 2006

(65) Prior Publication Data

US 2008/0139747 A1 Jun. 12, 2008

(51) Int. Cl.
 *C08L 63/00* (2006.01)
(52) U.S. Cl. ........................... 525/113; 525/119
(58) Field of Classification Search ........................ None
 See application file for complete search history.

(56) References Cited

U.S. PATENT DOCUMENTS

| | | | |
|---|---|---|---|
| 4,062,422 A | 12/1977 | Phelps, Jr. et al. | |
| 4,322,651 A | 3/1982 | Inoue et al. | |
| 4,476,285 A * | 10/1984 | Crabtree et al. | 525/113 |
| 4,482,659 A | 11/1984 | Sanjana et al. | |
| 4,530,962 A | 7/1985 | Alexander | |
| 4,695,598 A * | 9/1987 | Yamamoto et al. | 523/400 |
| 4,770,929 A | 9/1988 | Nobumasa et al. | |
| 4,798,761 A | 1/1989 | Wykowski et al. | |
| 4,883,712 A * | 11/1989 | Ogawa et al. | 428/367 |
| 4,902,368 A | 2/1990 | Oldman | |
| 4,977,218 A * | 12/1990 | Gardner et al. | 525/329.3 |
| 4,990,587 A * | 2/1991 | Shaw et al. | 528/113 |
| 5,025,068 A * | 6/1991 | Garcia et al. | 525/119 |
| 5,160,783 A * | 11/1992 | Nemoto et al. | 442/67 |
| 5,256,355 A | 10/1993 | Ramotowski | |
| 5,656,376 A | 8/1997 | Rafferty et al. | |
| 5,807,910 A * | 9/1998 | Tseng et al. | 523/428 |
| 6,440,755 B1 | 8/2002 | Ramotowski | |
| 6,521,706 B1 | 2/2003 | Desai et al. | |
| 6,787,579 B2 | 9/2004 | Czaplicki et al. | |
| 2006/0182949 A1* | 8/2006 | Salnikov et al. | 428/327 |

FOREIGN PATENT DOCUMENTS

JP 59-115322 A * 7/1984

OTHER PUBLICATIONS

Zeon Chemicals 2009 Product Guide for Nipol 1072, Zeon Corporation, 2009, 16 pages.*
Zeon's Rubber Guide 2008 for Nipol 1072, Zeon Corporation, 2008, 16 pages.*
Russell and Cartoff, Polymer, vol. 45, 2005, pp. 785-798.*

* cited by examiner

*Primary Examiner*—Robert Sellers
(74) *Attorney, Agent, or Firm*—James M. Kasischke; Michael P. Stanley; Jean-Paul A. Nasser

(57) ABSTRACT

A dampening material is presented with a carboxy-terminated butadiene nitrile (CTBN) as a dampening element. The glass transition temperature of the CTBN is generally at room temperature. The material is a two-component system with micro-scale phase segregation. The CTBN is reacted into an epoxy resin at a high temperature and cooled to allow the epoxy to react with a curing agent. A phase segregation occurs between the epoxy and the CTBN as the epoxy gels/cures. The extent of phase separation in the reaction is controlled by cross-linking and gelling. The rubbery component of CTBN phase segregates and forms discrete, spherical domains. Because the glass transition temperature of the rubbery domains is in the operational temperature range of interest, the composite is capable of absorbing acoustic energy. A high modulus allows a larger amount of acoustic energy to enter the composite where it is absorbed by the rubbery CTBN component.

13 Claims, 3 Drawing Sheets

MIXING AND CURING CARBOXY-TERMINATED BUTADIENE-NITRILE RUBBER, EPOXY RESIN AND CURING AGENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a castable and high-modulus acoustic dampening material, in which the material absorbs acoustic energy.

(2) Description of the Prior Art

The ability of a polymer to absorb acoustic energy and to function as an acoustic damper is due to the presence of energy absorbing transitions working within the normal operational temperature range of the dampening material. The most ideal energy absorbing transition is the glass transition (Tg) of the polymer.

Below the Tg of the polymer, the polymer is stiff and brittle. Above the Tg of the polymer, the polymer is soft and rubbery. A typical method for determining the Tg of a polymer is dynamic mechanical analysis (DMA). DMA can measure the real and imaginary components of the various mechanical moduli. As shown in FIG. 1, a DMA derived plot of loss tangent versus temperature exhibits a peak at the Tg of the polymer.

The Tg is a very "lossy" transition because it diverts energy into polymer chain motions. Chain motion as defined in this application is twisting or bunching of the polymer chains. The chains are not completely free to move past each other (as they would be in a melt), but long segments can twist, bunch up or relax (because above Tg there is enough space between neighboring chains to allow this, while below Tg—there is not).

Below Tg, only very short-range motions can occur because the polymer chains do not have the necessary free volume to execute long-range motions. When passing through the Tg from low to high temperature, an increase in free volume occurs that allows much longer segments of the polymer to move. These motions require (absorb) energy, as does the increase in free volume at Tg. Once the temperature exceeds the Tg, many more polymer motions are enabled, so there are many new ways to absorb energy.

To display the ability of a polymer to absorb energy, consider a rubber ball dropped to a floor (see FIG. 2). In the figure, the ball bounces, but the ball does not bounce back to the same height from which it was dropped. The real component (E') of Young's modulus is related to the height that the ball bounces back, and the imaginary component (E") is related to the difference between the original height and the height that the ball bounced back to. Thus, E' is related to energy stored within the polymer and available for recovery (the ball bouncing back up), while E" is related to lost energy (energy converted to random molecular motions in the polymer comprising the ball). This lost energy is typically converted to heat, which cannot be recovered to increase the height of the ball's return bounce. A quantity known as the loss tangent (or tan δ), defined as E"/E', is often used as a measure of how lossy a material is. A high loss tangent value implies a lossy material, which is good for acoustic dampening.

Referring again to the example of the ball when the ball is held at some distance above the ground, the ball possesses gravitational potential energy. As the ball falls, the ball gains kinetic energy (the energy of motion). When the ball collides with the floor, some of this kinetic energy is stored as elastic potential energy in the ball. The particles in the ball and the floor squeeze together like tiny springs. When the ball springs back to its original shape after being deformed, the elastic potential energy is returned to the ball causing it to rebound upward. The impact is said to be elastic.

"Hard" materials which are used in golf balls and steel balls are elastic materials in that the balls spring back to their original shape after being deformed. Even though these balls feel like they cannot be compressed, the balls actually do compress when they hit the floor or other surface. On the other hand, soft material in a ball causes it to absorb potential energy and to return to an original shape slowly or not at all, resulting in a low bounce or no bounce at all. This impact is said to be inelastic.

Because polymers are viscoelastic, polymers do not always respond in-phase to a cyclical deformation—the spring or immediate reaction component responds in-phase but the dashpot (the time delayed reaction component) does not, $$E^* = \left(\frac{\sigma^o}{\varepsilon^o}\right)\cos\delta +; \left(\frac{\sigma^o}{\varepsilon^o}\right)\sin\delta \quad (1)$$

or $$E^* = E' + iE''. \quad (2)$$

The dynamic moduli of polymers can be viewed as complex quantities, E*, for which there is the real (in-phase) component, E' and the imaginary (out-of-phase) component, E". Often E' is called the storage modulus (representing recoverable energy) while E" is called the loss modulus (representing non-recoverable energy). The ratio E"/E' is called the loss tangent—or tan δ, related to dampening.

Now observe a bounce and no-bounce ball set. Both balls can be the same size and shape and identical in every way, except for their individual bounce.

No-bounce balls are typically manufactured out of butyl rubber, which does not let gases pass through its molecular structure. However, butyl rubber has good electrical properties; has a chemical stability and resists sunlight, weather and moderate high temperature. No-bounce rubber is ideal for use in surface covering applications, such as lining tanks with butyl rubber to prevent leakage. Butyl rubber has also been used to make fabric-reinforced diaphragms and load leveling devices for automobiles, and has been considered for use in making car bumpers. In places where chemicals are used, where there is a need for low pressure, or where weather or high temperature might be a problem, no-bounce rubber is ideally suitable.

A bounce ball will work best (if not bouncing can be described as "working") if kept clean with a little soap and water. On the other hand, the ball that bounces is made out of a natural rubber that is highly resilient, which accounts for its bounce. Natural rubber has good adhesion properties to a wide range of materials; however, natural rubber also has some notable drawbacks. Natural rubber weathers poorly and reacts readily with sunlight, solvents, and oils to have a relatively short life expectancy.

Returning now to the discussion of the glass transition of a material, it may be apparent that most acoustic dampers are polymers whose Tgs are located in an operational temperature range of interest. Although that observation is true for some acoustic dampers, there is a problem with such materials. For an acoustic damper, the amount of energy that can enter the material (and, thus be absorbed) is related to the square root of the modulus of the material:

$$e = \frac{h \sqrt{E}}{\tau \sqrt{\rho}} \quad (3)$$

In Equation (3), e is the energy absorbed; h is a constant; $\lambda$ is the wavelength of the acoustic energy; and $\rho$ is the density of the material. Thus, a material whose Tg is located in the operational temperature range should exhibit a high loss tangent in the same temperature range (good for acoustic dampening) but the modulus of the material will be low. This means that the material will not absorb acoustic energy efficiently. The ideal acoustic damper would therefore possess both a high loss tangent and a high modulus in the operational temperature range of interest. However for a single material, these are diametrically opposed requirements because the requirements translate to both a high value of E' and at the same time, a high value for E''/E'.

In the prior art, Phelps et al. (U.S. Pat. No. 4,062,422) describes a dampening material that is an elastomeric sheet (nitrile rubber) and not a rubber-toughened epoxy. Thus, the dampening material is not high modulus, nor is the dampening material castable.

Inoue et al. (U.S. Pat. No. 4,322,651) describes a different chemical structure from the Phelps reference for the dampening material. As described in the Inoue reference, the dampening material is composed of silicone rubber and epoxy resin (sometimes with an added inorganic oxide powder).

Sanjana et al. (U.S. Pat. No. 4,482,659) describes a structure similar to a rubber-toughened epoxy. In the cited reference, the goal is to make a water-soluble resin suitable for casting high impact strength and high dampening laminate structures (e.g., fiberglass parts, etc.). It appears that a carboxy-terminated butadiene nitrile (CTBN) component is added to increase the number of cross-links, with a primary function to increase the molecular weight of the epoxy resin chains from about 300 to about 5000. The cited reference suggests that the preferred molecular weight of its rubbery component is 500,000 to 10,000,000.

The Sanjana reference also states that the preferred glass transition temperature for the CTBNs is "<−20°". The greater the difference from room temperature (or the temperature of interest) that the glass transition of the CTBN is, the less acoustic or vibrational energy will be absorbed/dampened.

Alexander (U.S. Pat. No. 4,530,962) generally describes ways to make rubber-modified epoxies. The cited reference uses only unsaturated polymers, and does not discuss the use of any of the rubber-modified polymers for acoustic dampening applications.

Nobumasa et al. (U.S. Pat. No. 4,770,929) discusses the use of certain rubber-modified epoxies as acoustic dampers. Some of the descriptions contained in the cited reference can be alternatively construed, especially the description in column 5, lines 1-10, that the addition of CTBNs to epoxies causes an increase in vibration dampening. While this may be strictly true (because epoxies are very poor dampers in their unmodified state); the degree of improvement cited in the cited reference is actually insignificant and would not qualify the resulting material as an acoustic damper. For example: the "dampening loss factors" for some of the dampening materials produced using the techniques described in the reference are presented. The values are, in reality, extremely low—for the CTBN modified epoxies (a value of 0.01 is cited). None of the dampening materials apparently exhibit a dampening loss factor greater than 0.015. These values are so low that they would be acceptable for use in applications where acoustic "clarity"—no dampening is desired. The Nebumasa reference also does not contemplate that the CTBN component must phase-segregate from the epoxy during curing.

With too much acrylonitrile, the CTBN component will not phase-segregate at all. With too little acrylonitrile, the CTBN component will not initially dissolve in the epoxy resin. Getting the right micro-scale geometry for the rubbery component in the rubber toughened epoxy is very important for high dampening properties, yet this issue is not addressed in the cited reference.

Wykowski et al. (U.S. Pat. No. 4,798,761) generally discusses rubber-toughened epoxies, but the cited reference does not discuss the epoxies with respect to their possible superior acoustic dampening properties. In the cited reference, the focus is on using rubber-toughened epoxies to repair damaged sections of composites. For such applications, the cured strength, water resistance, and low temperature curing properties are the most important. Only a small subset of specially designed rubber toughened epoxies would be expected to exhibit superior dampening properties (see the discussion for the Nobumasa reference).

In Oldman (U.S. Pat. No. 4,902,368), the cited reference mentions rubber toughened epoxies briefly but the cited reference is primarily focused on epoxy-silicone polymers. The reason for this focus is the desire for the resulting compounds to be stable at high temperatures—something that the addition of silicone would improve. When the possibility of adding CTBNs to epoxy to make polymers is discussed, it is quickly dismissed, because the addition of CTBNs would not increase (and might decrease) the thermal stability of the resulting polymer.

It is also noted that the finished polymers are described as "clear cured resins". This indicates that there has been no micro-scale rubber-epoxy phase separation in these polymers. Micro-scale phase segregation causes polymers to become opaque, because the rubbery domains are large enough (1-10 microns in diameter) to interact with visible light.

Rafferty et al. (U.S. Pat. No. 5,656,376) describes a vibration dampening elastomer layer incorporated into propulsion shaft supports. The dampening layer does not contain any rubber-toughened epoxy—the layer is completely composed of an elastomer. The rubber toughened epoxy layer appears to be providing structural support and not dampening, and may be rubber toughened to increase impact resistance.

Desai et al. (U.S. Pat. No. 6,521,706) describes epoxies containing a particulate filler comprised of ground-up rubber. The materials described in the cited reference are not rubber-toughened epoxies (where the rubber initially is dissolved in the epoxy and later phase segregates from the epoxy during the curing process); they are simple composites.

The cited reference indicates that the epoxy also contains a thermoplastic that is "essentially insoluble" in the epoxy resin. In the materials described in the reference, the rubbery component is a simple filler that is not chemically bonded to the epoxy resin matrix. Also, the cited reference suggests that the optimum size for the rubbery domains is 1-300 microns, while in rubber toughened epoxies the optimum rubbery domain sizes are 1-10 microns. It is unlikely that the materials described in the cited reference could have such small rubbery domains, because it is difficult to produce such small particles by grinding and sieving through a mesh (the methods of rubber particle generation described).

Czaplicki et al. (U.S. Pat. No. 6,787,579) describes "foamed epoxy formulations" intended for use in "foam in place" applications and the reinforcement of structural materials. Thus, the materials are not designed nor optimized for acoustical dampening. The cited reference does contemplate the use of liquid butadiene-acrylonitrile copolymer rubbers that may be functionalized with carboxyl groups, as additives in the foamed epoxy, but the use of ground-up rubber is also contemplated. The liquid rubber comment mentioned above appears in the section of the cited reference that discusses "optional additives". Making the resulting epoxy tougher and/or more flexible are the reasons given in the cited reference for adding liquid rubber to the epoxy. These materials are not being added to improve acoustic dampening.

As described previously, it is not possible for a single component system to be both high dampening and high modulus at the same time. However, it is possible to approach that ideal situation with a two-component system. In such a system, one component (the "lossy" one) is dispersed within a high modulus (and less lossy matrix material). This method has been used to produce one of the most commonly used high-modulus acoustic dampening materials, synthetic acoustic dampening material (SADM). Unfortunately, the lossy component in SADM contains powdered lead, and thus presents extreme toxicity issues. Also, the cohesive strength of SADM is low, and the material is quite brittle.

In regard to the above-mentioned references, a need still exists for a high-modulus acoustic dampening material that can absorb acoustic energy with the material minimizing toxicity issues.

SUMMARY OF THE INVENTION

It is therefore a general purpose and primary object of the present invention to provide a castable and high-modulus acoustic dampening material that is designed to absorb acoustic energy.

The object described is attained with the present invention by providing carboxy-terminated butadiene nitrile (CTBN) as the dampening element. CTBN has Tgs in the temperature range of interest as a result of its chemical and physical structure. Certain chemical structures favor lower Tgs (e.g. long flexible polymer backbones versus stiff or highly cross-linked polymer backbones). It is possible to manipulate Tg by polymer chain length, addition of pendant groups and the absence of fillers and plasticizers.

The rubbery component is preferably the CTBN material with a length of polymer chains (molecular weight) of approximately 3000 to 4000 Daltons, a percent acrylonitrile content of 18% +/−4%, and a glass transition temperature of 25 degrees centigrade for room temperature dampening (for dampening at other temperatures, the glass transition of the rubbery component should be equal to the operational temperature).

A curing agent that may be used for the material is 2-ethyl-4-methylimidazole. Another possible curing agent is n-aminoethylpiperazine. For the curing agent ratio of a 3-4 Phr (parts per hundred of resin), a wide variety of epoxy resins and epoxy curing agents known to those ordinarily skilled in the art can also be used. The solubility of the CTBN component would have to be determined, and the acrylonitrile content specified for each particular resin/curing agent combination.

The present invention is a two-component system. The system uses phase segregation common to rubber toughened epoxy (RTE) systems. In the method, the CTBN is reacted into the epoxy resin at a high temperature.

Once the modified epoxy resin cools, the epoxy is reacted with the appropriate curing agent. Phase segregation occurs between the epoxy and the CTBN based on the gelation rate of the epoxy system at an ambient temperature for approximately one hour. There is a "sharing of parts" in the chemical reaction by cross-linking and gelling.

As the epoxy resin cross-links and gels, the rubbery component will phase segregate from the epoxy and form discrete, spherical rubbery domains throughout the epoxy resin. These rubbery domains impart a significant improvement in toughness and cracking resistance to the epoxy resin. Also, because the Tgs are in the operational temperature range of interest, the materials exhibit high mechanical loss tangents and are capable of absorbing acoustic energy.

The amount of rubber added to the epoxy is low enough that the modulus of the resulting composite does not vary much from the unmodified and high modulus epoxy resin. This high modulus allows a larger amount of acoustic energy to enter the material, where it is absorbed by the rubbery component.

The resultant material is non-brittle and when cast in place the material exhibits adhesion to many surfaces. In addition, the low inherent toxicity of the material makes the material an ideal replacement for lead-containing SADM acoustic dampening material.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
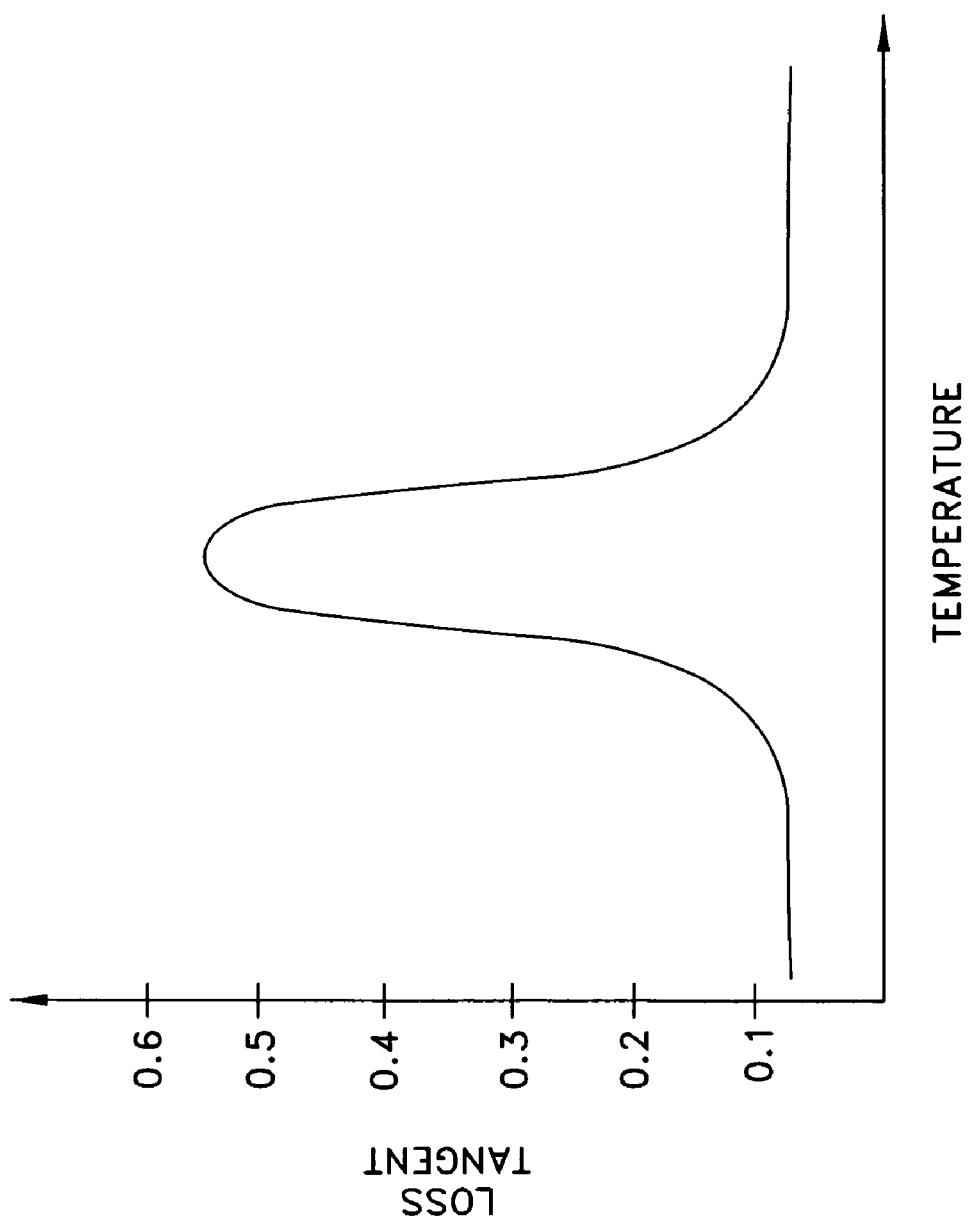
FIG. 1 depicts a Dynamic Mechanical Analysis plot for glass transition (Tg)
Figure 2:
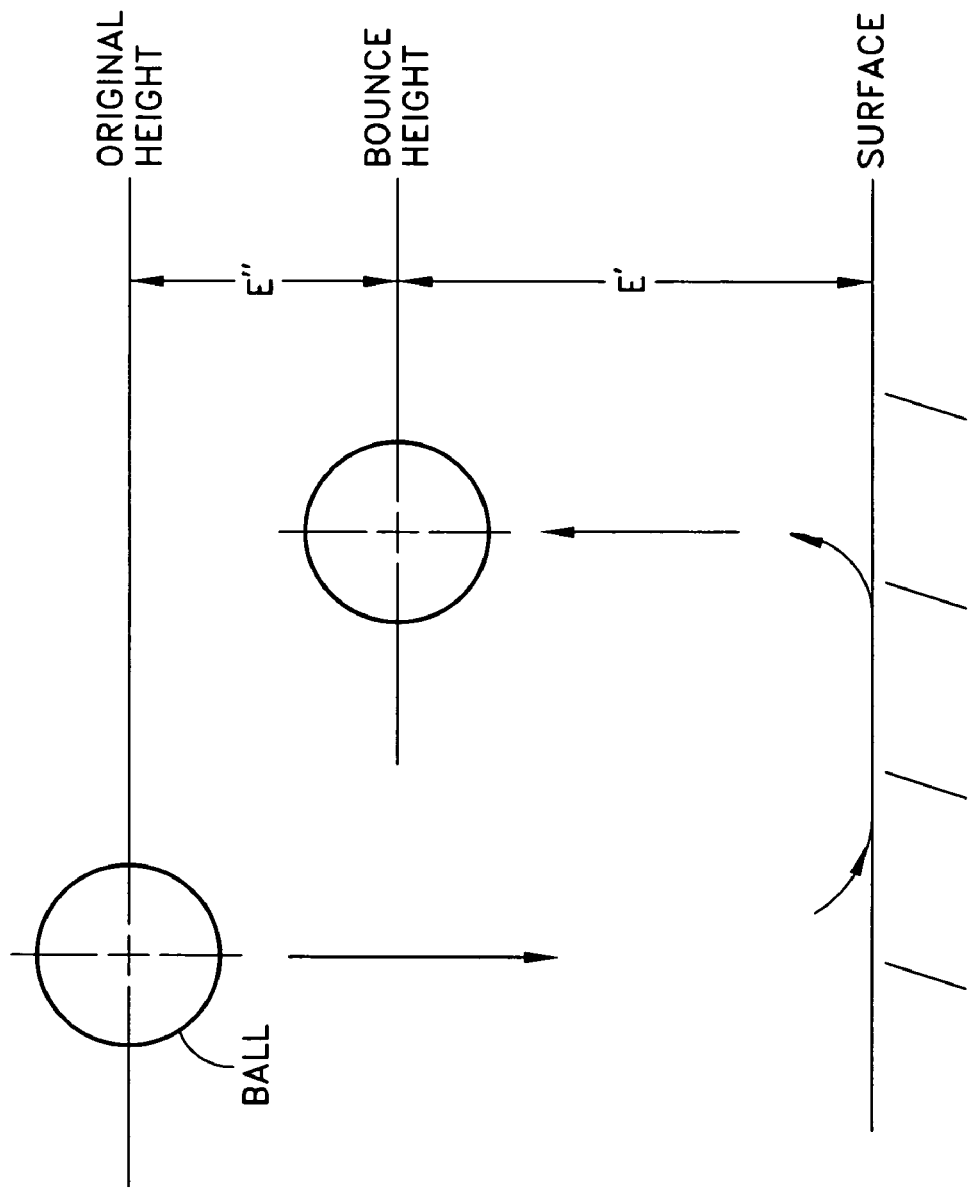
FIG. 2 depicts a ball bounced on a surface with a height that a ball bounces back from the surface.
Figure 3:
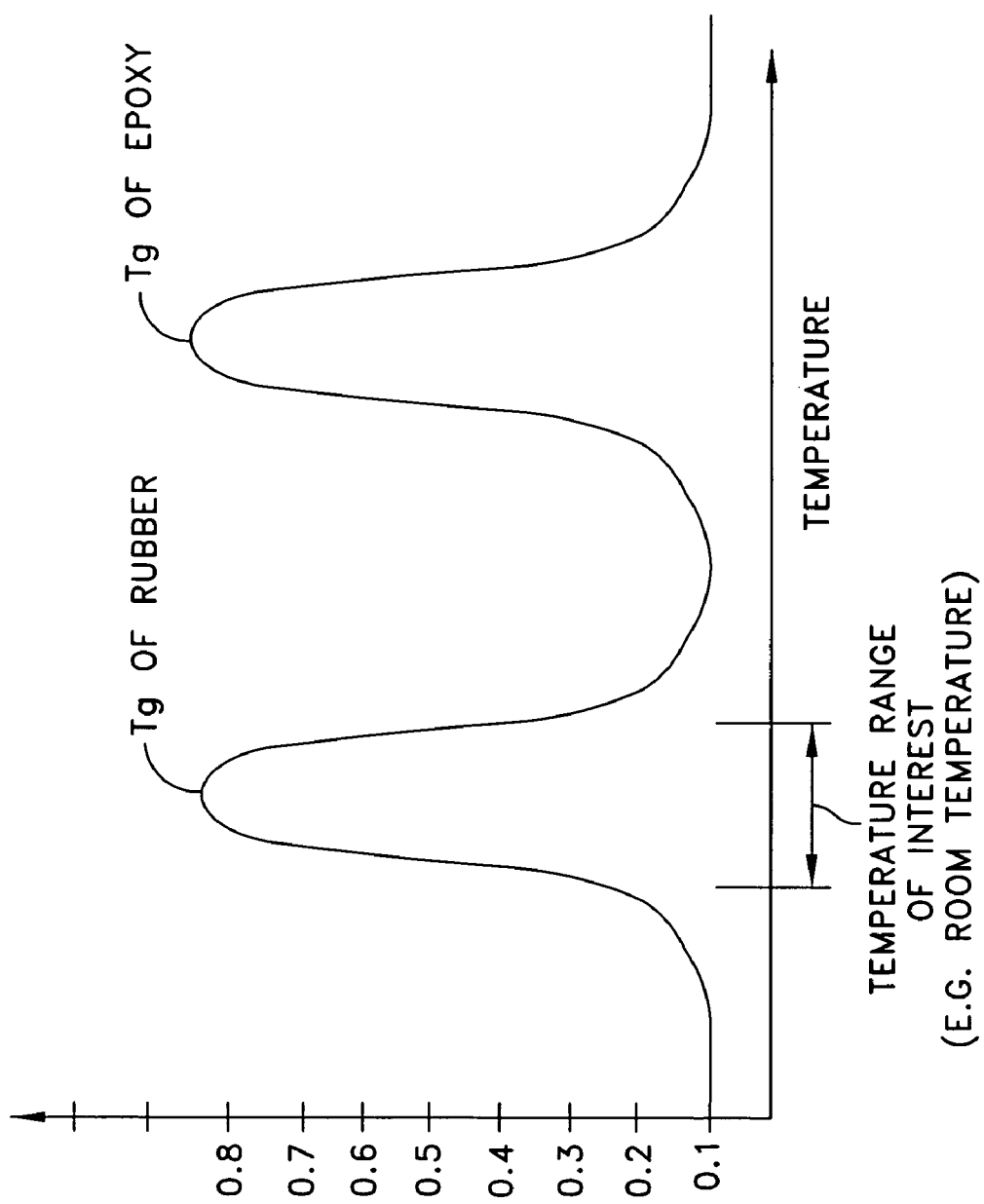
FIG. 3 depicts a DMA plot for the acoustic damper material described by the present invention.

In the present invention, a high-modulus acoustic dampening material is provided with carboxy-terminated butadiene or preferably carboxy-terminated butadiene nitrile (CTBN) as the dampening element. FIG. 3 depicts advantages and features of the present invention.

To perform as the dampening element, the glass transition temperature of the rubbery component (CTBN) should be at or near room temperature. The CTBN has a molecular weight of approximately 2000 to 4000 Daltons, an 18% +/−4% acrylonitrile content and a glass transition temperature of 25 degrees centigrade (for room temperature dampening). Acrylonitrile increases the solubility of the CTBN in the epoxy resin.

For dampening at other temperatures, the glass transition of the material or rubbery component should be equal, or very close to, the operational temperature. The mechanical loss tangent (tan delta, E"/E') of the rubbery component should be not less than 0.5 at the temperature of interest (preferably it should be between 0.5 and 1.00—the higher, the better). Examples of available curing agents include 2-ethyl-4-methylimidazole, n-aminoethylpiperazine or similarly known commercial materials. For the epoxy, EPON 826, or EPON 827, or similar materials known to those skilled in the art can be used. The solubility of the CTBN component would have to be determined, and the acrylonitrile content specified for each particular resin/curing agent combination.

As described above, it is not possible for a single component system to be both high dampening and high modulus at the same time. It is, however, possible to approach that ideal situation with a two-component system. In the present invention, one component (the lossy material, CTBN) is dispersed within a high modulus (and less lossy matrix material, epoxy resin).

The present invention uses phase segregation common to rubber-toughened epoxy (RTE) systems. Liquid rubber toughening agents such as CTBs (carboxy terminated butadienes) but preferably CTBNS of 10-30 parts per 100 parts of epoxy resin are reacted into the epoxy resin at a high temperature (approximately 150° centigrade). A lower temperature may be used if more time is available. The components are mixed by a stirring process similar to stirring a thick high viscosity liquid.

Once the modified epoxy resin cools, the epoxy resin is reacted with the curing agent. Phase segregation occurs between the epoxy resin and the CTBN with both components based on the gelation rate of the epoxy. There is a sharing of parts in the chemical reaction by cross-linking and gelling. As the epoxy resin cross-links and gels, the rubbery component will phase segregate from the epoxy resin and form discrete, spherical rubbery domains (1-10 microns in diameter) throughout the epoxy resin. The curing agents at ambient or higher temperatures support/encourage this morphology via 3-D cross-linking between the rubber and the epoxy.

The rubbery component (CTBN) imparts to the epoxy resin a significant improvement in toughness and cracking resistance. Also, because the Tgs of the CTBN are in the operational temperature range of interest, the Tgs exhibit high loss tangents; and are capable of absorbing acoustic energy (see the DMA plotting of FIG. 3). The amount of the rubbery component added to the epoxy resin is low enough that the modulus of the resulting composite is similar to the unmodified epoxy resin (i.e., it is a high modulus). This allows a larger amount of acoustic energy to enter the material, where it is absorbed by the rubbery component.

The materials are non-brittle when cast in place and exhibit adhesion to many surfaces. Also, the resulting acoustic dampening material produced by the method of the present invention exhibits improved crack resistance, toughness, and is much less brittle than presently known materials.

The material of the present invention can also be cast into any desired shape. Existing high modulus damping material, such as SADM is cast into blocks. These blocks then have to be machined into the desired shapes by the end user. Machining a material containing significant amounts of lead is problematic from a health and contamination standpoint. The dampening component of the present invention is dispersed on a microscopic level through out the material rather than on a macroscopic level as discrete chunks. The low inherent toxicity of the materials makes them ideal replacements for lead-containing SADM acoustic dampening material.

In variations of the present invention, different end groups can be used in place of carboxylic acids on the rubbery (CTB/CTBN) components. For example: amine-terminated versions can be used.

The Tgs of the rubber components can also be varied to achieve optimum dampening at different temperatures and processing conditions can be changed (e.g., different cure temperatures).

Furthermore, different percentiles of acrylonitrile can be incorporated into the CTBN rubbery additives to improve solubility of the same in the epoxy resin. Acrylonitrile is a polar chemical group (i.e., it has a strong dipole) so the acrylonitrile imparts some polarity to the polymer. Most epoxy resins are also polar, so an increase in polarity helps the rubbery component dissolves in the epoxy resin (a necessary step in making the material). If too much acrylonitrile is present, the rubbery component will not phase segregate (or will do so poorly) when the epoxy cures.

The foregoing description of the preferred embodiments of the invention has been presented for purposes of illustration and description. It is not intended to be exhaustive nor to limit the invention to the precise form disclosed; and obviously many modifications and variations are possible in light of the above teaching. Such modifications and variations that may be apparent to one skilled in the art are indicated to be included within the scope of this invention as defined by the accompanying claims.

What is claimed is:

1. A method for producing a high-modulus acoustic dampening material, said method comprising the steps of:
   providing a rubber component of carboxy-terminated butadiene nitrile with a glass transition temperature of approximately 25 degrees Centigrade;
   mixing the carboxy-terminated butadiene with an epoxy resin;
   heating the mixture to a temperature greater than 72 degrees Centigrade and allowing the components to react for an hour;
   cooling the mixture at an ambient temperature; and
   curing the carboxy-terminated butadiene nitrile epoxy resin with a curing agent thereby triggering phase separation between the CTBN and epoxy to form the dampening material.

2. The method according to claim 1 wherein said carboxy-terminated butadiene nitrile has a molecular weight in the range of 2000-4000 Daltons.

3. The method according to claim 1 wherein the temperature to which the components and the curing agent is mixed is at 150° Centigrade.

4. The method according to claim 3 wherein the carboxy-terminated butadiene nitrile has between 14-22 percent acrylonitrile content.

5. The method according to claim 4 wherein a mechanical loss tangent of the carboxy-terminated butadiene nitrile is between 0.5 and 1.0.

6. The method according to claim 5 wherein the curing agent is 2-ethyl-4-methylimidazole.

7. The method according to claim 5 wherein the curing agent is n-aminoethylpiperazine.

8. The method in accordance with claim 1 wherein said mixing step is a stirring action.

9. The method according to claim 1 wherein the temperature to which the components and curing agent is mixed is at 150° centigrade.

10. The method according to claim 9 wherein the carboxy-terminated butadiene nitrile has between 14-22 percent acrylonitrile content.

11. The method according to claim 10 wherein a mechanical loss tangent of the carboxy-terminated butadiene nitrile is between 0.5 and 1.0.

12. The method according to claim 11 wherein the curing agent is 2-ethyl-4-methylimidazole.

13. The method according to claim 11 wherein the curing agent is n-aminoethylpiperazine.

* * * * *